2,999,007
PROCESS OF PREPARING ANHYDRITE OF IMPROVED WHITENESS FROM OFF-WHITE GYPSUM

Herbert A. McKenzie, Amherst, and Alan Stanley, Lynchburg, Va., assignors to American Cyanamid Company, New York, N.Y., a corporation of Maine
No Drawing. Filed July 29, 1958, Ser. No. 751,649
7 Claims. (Cl. 23—122)

The present invention relates to the manufacture of anhydrite of improved whiteness from a calcium base by reaction with weak sulfuric acid containing iron, chromium, vanadium, manganese or similar color-producing impurities. The invention likewise relates to the manufacture of anhydrite of improved whiteness from gypsum containing such color-forming impurities in its crystal lattice.

Anhydrite ($CaSO_4$) is an article of commerce principally used as an extender for more valuable white pigments, for example, titanium dioxide. It has long been known that anhydrite suitable for the purpose mentioned can be manufactured in a one-step process directly from a calcium base and substantially pure sulfuric acid, i.e., sulfuric acid having substantially no color-forming impurities. Pure white anhydrite precipitates directly in the acid and is recovered by filtration, after which it is washed.

It has furthermore long been known that the process can be performed in two steps. In the first step, the calcium base may be reacted with sulfuric acid (between about 5%–25% strength) with formation of an acidic suspension of gypsum ($CaSO_4 \cdot 2H_2O$). In the second step the gypsum is reacted with hot sulfuric acid, as a result of which the gypsum is converted to anhydrite.

Up to the present it has been believed that in the two step process, production of pure white anhydrite is dependent upon the use of uncontaminated sulfuric acid in at least the first step. It has long been known that when sulfuric acid containing even trace amounts of one or more of the color-forming impurities mentioned above is used in the first step, dirty or off-color anhydrite is obtained which cannot be brought up to standard by ordinary washing treatments, even when prolonged. The evidence is that this off-color effect is the result of structural distortion of the calcium sulfate crystal lattice owing to the presence of minute amounts of one or more of the extraneous metal cation impurities, so that the crystals no longer reflect all colors uniformly, giving white, but reflect certain colors better than others. Laboratory analyses show that the amount of metal cation impurities present is far too small to cause the effect by the natural tinctorial values of the cations.

The discovery has now been made that sulfuric acid contaminated with at least one of the metal sulfates mentioned above can be used substantially as effectively as pure sulfuric acid in the first step of the above-described process provided that the second step of the process, i.e., the step in which the gypsum is dehydrated to anhydrite, is performed under reducing conditions. Evidently these reducing conditions permit the extraneous cations to escape from the lattice into the acid when the two molecules of water are removed, so that the impurities can thereafter be washed away. It has thus been found that gypsum rendered off-white by the presence of at least one metal cation selected from the group consisting of iron, chromium, vanadium, and columbium in its crystal lattice can be converted to anhydrite of improved whiteness by heating with sulfuric acid under reducing conditions.

The first step of the process may be performed by slowly adding a convenient calcium base (calcium carbonate, oxide, hydroxide, etc.) to impure sulfuric acid of convenient (e.g., 5%–50%) strength. The reaction proceeds at room temperature and off-color gypsum selectively precipitates; the sulfuric acid is predetermined as to strength and quantity so that the gypsum slurry which is obtained is sufficiently acid (pH less than 5 and preferably less than 1) to prevent hydrolysis of the soluble salts present. The gypsum is then washed to remove all free (i.e., unadsorbed) soluble metal sulfates present. For this purpose wash water having a pH less than about 5 is preferred for the reason stated. The specific preferred acid for use in this step is the end liquor obtained in the manufacture of titanium dioxide pigment by the sulfate process. Such liquor contains 10% to 35% by weight of sulfuric acid, 1% to 15% of iron sulfate, and up to about 5% by weight of other color-forming impurities such as chromium, vanadium, manganese, and columbium sulfates.

In the second step the off-color gypsum is dehydrated by heating with pure sulfuric acid under reducing conditions. By "pure" sulfuric acid is meant sulfuric acid containing substantially none of the polyvalent cations mentioned. In commercial practice the dehydration is advantageously performed at about the reflux point of the acid. The initial strength and quantity of the acid are predetermined so that the strength of the acid in the final slurry after dehydration is in excess of about 5%, so as to ensure substantially complete dehydration of the gypsum with maintenance of an acid pH to prevent hydrolysis. The reducing conditions may be provided by addition of metallic iron or zinc or by electrolysis, the nascent hydrogen acting as reducing agent. As stated, however, we find it most convenient to produce the reducing conditions by the addition of titanous sulfate as this material is very soluble in sulfuric acid and is stable against hydrolysis therein. Moreover, it has a characteristic blue color which changes to white when oxidized.

Enough titanous sulfate is added so as to reduce any polyvalent material initially present and an additional amount is provided so that at least some is present when the dehydration step has been completed. As a rule of thumb, at least about 0.5 gm. per liter of reduced titanium calculated as $TiO_2$ should be present at the beginning of the dehydration. An excess (up to at least 10 gm. per liter calculated on the same basis) does no harm. We find that the initial presence of between about 1.5 and 5.0 gm. per liter of reduced titanium is satisfactory, amounts in this range avoiding the danger of having too little present while minimizing waste of this material.

The anhydrite recovered from the second step after washing is brilliantly white in color and has substantially the same color as anhydrite prepared by the use of pure sulfuric acid throughout. The recovered anhydrite may be ground, hydroclassified and otherwise treated to improve the pigmentary properties thereof.

The invention will be more particularly illustrated by the example which follows. This example constitutes a preferred embodiment of the invention and is not to be construed as a limitation thereon.

The invention does not primarily depend upon the quantity of sulfuric acid used in the steps of the process nor in the precise strength thereof.

Example 1

The following illustrates the preparation of pigment grade anhydrite according to the present invention using as the impure, weak acid the end liquor obtained in the manufacture of titanium dioxide pigment by the sulfate process. The end liquor was prepared by digestion of ilmenite ore with sulfuric acid thereby forming a crude titania sulfate-titanyl sulfate digestion cake, dissolving the cake in water, removing insolubles, and thermally hydrolyzing the titania sulfate in the solution to titania hydrate which precipitates. The liquor contained 21% by weight of sulfuric acid as $H_2SO_4$, 11.0% of iron sulfate calculated as $FeSO_4$, 0.03% of chromium sulfate as $Cr_2O_3$, 0.08% of vanadium sulfate as $V_2O_5$, and 0.15% of manganese sulfate as MnO.

*Run 1.*—A portion of this end liquor was diluted to 10% $H_2SO_4$ content by addition of water to moderate the subsequent reaction. To 1500 gm. of this liquor was slowly added with stirring 85 gm. of slaked lime, $Ca(OH)_2$. Gypsum formed at once and was allowed to settle. The liquor was filtered off and the gypsum was washed for two hours on a Büchner funnel with water containing 1% of sulfuric acid. At the end of the washing the cake was light tan in color but contained no unadsorbed (soluble) polyvalent metal salts as shown by analysis of the wash water.

50 gm. of this gypsum was slurried in 150 ml. of water in a 3-necked flask equipped with stirrer, thermometer and reflux condenser and 30.8 gm. of pure 93% sulfuric acid was added. The aqueous phase contained 15.2% $H_2SO_4$ by weight. The mixture was refluxed (104.5° C.). Dehydration was complete at the end of 15 minutes. The resulting anhydrite was filtered, washed for 2 hours with 1% sulfuric acid, and dried. The product had the color rating of −2Br, compared with chemically pure anhydrite as standard, i.e., it differed from the standard by two discernible points towards brown.

*Run 2.*—The foregoing procedure was repeated except that dilute titanous sulfate solution was slowly run with vigorous agitation into the slurry solution immediately after addition of the 93% acid until the aqueous phase analyzed 5 gm./liter of titanous sulfate calculated as $Ti_2O_3$. The color rating of the resulting anhydrite was equal to that of the standard.

We claim:

1. Process for manufacturing anhydrite of improved whiteness from gypsum rendered off-white by the presence of at least one metal cation selected from the group consisting of iron, chromium, vanadium, and columbium cations, in the crystal lattice thereof, which consists essentially in dehydrating said gypsum to anhydrite by heating said gypsum with substantially pure sulfuric acid under reducing conditions.

2. Process for manufacturing anhydrite of improved whiteness from gypsum rendered off-white by the presence of at least one metal cation selected from the group consisting of iron, chromium, vanadium, and columbium cations, in the crystal lattice thereof, which consists essentially in dehydrating said gypsum to anhydrite by heating said gypsum with substantially pure sulfuric acid containing titanous sulfate as reducing agent.

3. Process for manufacturing substantially white anhydrite from an inorganic calcium base and weak, impure sulfuric acid containing at least one metal sulfate from the group consisting of iron, chromium, vanadium, and columbium sulfate, which consists essentially in reacting said base with said weak, impure acid to form an acidic suspension of gypsum, washing said gypsum to remove soluble metal sulfates, and dehydrating said gypsum to anhydrite by heating said gypsum with substantially pure sulfuric acid under reducing conditions.

4. A process according to claim 3 wherein the calcium base is limestone.

5. A process according to claim 3 wherein the impure sulfuric acid is end liquor resulting from the manufacture of titanium dioxide pigment by the sulfate process wherein oxidic titaniferous material is digested with sulfuric acid thereby forming a crude titania sulfate digestion cake, the cake is dissolved in water, and the titania sulfate is thermally hydrolyzed to titania hydrate.

6. A process according to claim 3 wherein the gypsum is washed with water having a pH less than 5.

7. Process for manufacturing substantially white anhydrite from an inorganic calcium base and weak, impure sulfuric acid containing at least one metal sulfate from the group consisting of iron, chromium, vanadium, and columbium sulfate, which consists essentially in reacting said base with said weak, impure acid to form an acidic suspension of gypsum, washing said gypsum to remove soluble metal sulfates, and dehydrating said gypsum to anhydrite by heating said gypsum with substantially pure sulfuric acid containing titanous sulfate as reducing agent.

References Cited in the file of this patent

UNITED STATES PATENTS

| | | |
|---|---|---|
| 2,021,910 | Crundall | Nov. 26, 1935 |
| 2,066,074 | Ryan et al. | Dec. 29, 1936 |
| 2,197,003 | Mowlds | Apr. 16, 1940 |
| 2,326,157 | McCord et al. | Aug. 10, 1943 |